United States Patent [19]

van Geenen et al.

[11] Patent Number: 4,540,515

[45] Date of Patent: Sep. 10, 1985

[54] N-SUBSTITUTED CARBAMOYL-LACTAM COMPOUND

[75] Inventors: Albert A. van Geenen, Brunssum; Joseph J. M. Bongers, Elsloo; Jozef L. M. van der Loos, Sittard; Cornelis H. Vrinssen, Geleen, all of Netherlands

[73] Assignee: Stamicarbon B.V., Licensing Subsidiary of DSM, Geleen, Netherlands

[21] Appl. No.: 641,773

[22] Filed: Aug. 17, 1984

[30] Foreign Application Priority Data

Aug. 20, 1983 [NL] Netherlands .......................... 8302928

[51] Int. Cl.³ .......................................... C07D 223/10
[52] U.S. Cl. ............................................. 260/239.3 R
[58] Field of Search ................................. 260/239.3 R

[56] References Cited

U.S. PATENT DOCUMENTS 3,704,280 11/1972 van der Loos .
4,211,699 7/1980 Winkelmann ................. 260/239.3 R
4,313,876 2/1982 Gras ............................. 260/239.3 R

FOREIGN PATENT DOCUMENTS 57-33014 9/1983 Japan .

Primary Examiner—Paul R. Michl
Attorney, Agent, or Firm—Cushman, Darby & Cushman

[57] ABSTRACT

The invention concerns an N-substituted carbamoyl-lactam compound characterized by the formula:

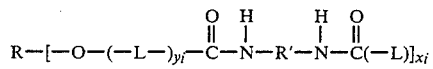

where in the formula:
  R is a polyol radical from a polyol having the formula $R-(OH)_{x_i}$, where $x_i$ is an integer $\geq 2$
  R' is an alkyl, whether or not cyclic aralkyl, alkaryl or aryl group, $y_i$ is an integer $> 0$,
  (—L) is an unopened lactam ring and
  (—L—) is an opened lactam block. The compounds are highly suited for use as activators in preparing nylon block copolymers.

8 Claims, No Drawings

N-SUBSTITUTED CARBAMOYL-LACTAM COMPOUND

BACKGROUND OF THE INVENTION

The invention relates to a N-substituted carbamoyl-lactam compounds.

In the anionic polymerization of lactams, such as caprolactam, N-substituted carbamoyl-lactam compounds are suitable promoters, or activators, for the polymerization reaction. These compounds can be used in the reaction-injection-molding (RIM) of nylon. Such compounds can provide short reaction times which makes it possible to polymerize the lactam in the mold without unduly long polymerization times.

The reaction-injection molding (RIM) method basically is a one-shot injection of liquid components, usually by impingement, into a closed mold where rapid polymerization occurs thereby resulting in a molded plastic product.

In a RIM process, viscosity of the materials fed to a mold is about 50 cps to 10,000 cps, preferably about 1500 cps, at injection temperatures varying from room temperature for urethanes to about 150° C. for lactams. Mold temperatures in a RIM process typically range from about 100° C. to about 220° C. The mold pressures generally range from about 1 bar to 100 bar and more particularly range from about 1 bar to about 30 bar. At least one component in the RIM formulation consists of monomers and adducts thereof that are polymerized to a polymer in the mold.

RIM differs from injection molding in a number of important respects. The main distinction between injection molding and RIM resides in the fact that in RIM, a chemical reaction takes place in the mold to transform a monomer or adducts to a polymeric state. Injection molding is conducted at pressures of about 700 bar to 1400 bar in the mold cavity by melting a solid resin and conveying it into a mold maintained at room temperature and the molten resin at about 150° C. to 350° C.

The pressures employed in the RIM method are much lower than in conventional injection molding processes. At injection temperature of about 150° C. to 350° C., viscosity of the molten resin in an injection molding process is generally in the range of 50,000 cps to 1,000,000 cps and typically about 200,000 cps. In injection molding process, solidification of the resins occurs in about 10 seconds to 90 seconds, depending on the size of the molded product, following which, the molded product is removed from the mold. There is no chemical reaction taking place in an injection molding process when the resin is introduced into a mold.

For practical purposes, in a RIM-process the chemical reaction must take place rapidly in less than about 2 minutes for smaller items.

The following developments in the anionic polymerization nylon are known.

The polymerization of a lactam to obtain nylon has been known for many years.

In U.S. Pat. No. 3,018,273 a process for the in situ polymerization of caprolactam is described, wherein an organomagnesium compound is used as an initiator, and an N,N diacyl compound is used as promoter (or activator).

British Pat. No. 1,067,153 describes a process for preparing nylon-block-copolymers by anionically polymerizing caprolactam in the presence of various activators suitable for preparing nylon 6 polymers. Preparation of nylon block copolymers using an isocyanate terminated polypropylene glycol and a potassium based catalyst is described; a nylon block copolymer containing at least one polyether block is thereby formed.

In U.S. Pat. Nos. 3,862,262, 4,031,164, 4,034,015 and 4,223,112 various aspects of the preparation of nylon block copolymers from caprolactam in the presence of an acyllactam activator are described.

U.S. Pat. Nos. 4,031,164 and 4,223,112 describe the lactam-polyol-polyacyl-lactam-block terpolymers having a specified ratio of the various components. More particularly, the former patent discloses the use of 18% to 90% by weight of polyol blocks in the terpolymer.

U.S. Pat. No. 3,862,262 describes lactam-polyol-acyl-polylactam block-terpolymers.

U.S. Pat. No. 4,034,015 is directed to lactam-polyol-polyacyl-lactam or lactam-polyol-actyl-polylactam block terpolymers having at least about 5% ester end group termination.

U.S. Pat. No. Re. 30,371 describes preparing polyester-polyamide compounds by condensation of an alcohol and acyllactams in the presence of at least one of a Group IA, IIA, IIB, and IIIA metal or metal compound.

U.S. Pat. No. 3,925,325 describes a catalyzed process for the preparation of monomeric and/or polymeric compounds such as esters, polyesters, ester amides, and polyester-polyamides which result from the reaction of an imide and an alcohol in the presence of an organoaluminium, imide-alcohol condensation catalyst.

U.S. Pat. No. 3,965,075 describes using an amide or a Group IVA, IB, IVB, VB, VIB, or VIII organometal compound for this condensation.

In European patent application No. 67693, now laid open to public inspection, acid halide materials and acyllactam functional materials are described as useful in the preparation of nylon block copolymers selected from the group consisting of those having the formula:

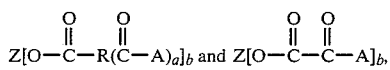

wherein
A is X or Q,
X is halogen,
Q is

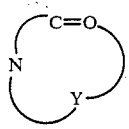

with Y=C$_3$–C$_{11}$ alkylene;
a is an integer equal to 1, 2 or 3;
b is an integer equal to or greater than 2;
R is a di- or polyvalent group selected from hydrocarbon groups and hydrocarbon groups containing ether linkages; and
Z is a segment of:
(1) a polyester having a minimum molecular weight of 2,000,
(2) a polyester containing polyester segments having minimum molecular weights of about 2000,
(3) a segment of a hydrocarbon or
(4) a polysiloxane.

European patent application No. 67,695, now laid open to public inspection, describes a process for preparing a nylon block copolymer by reactively contacting a lactam monomer, a basic lactam polymerization catalyst and the acyllactam functional material described in European patent application No. 67,693.

European patent application No. 67,694, now laid open for public inspection is directed to acid halide and acyllactam functional materials and to a process for the preparation of nylon block copolymers therewith. The acid halide or acyllactam functional materials are selected from a group defined by a complex formula.

A paper by Sibal et al, Designing Nylon 6 Polymerization Systems for RIM', apparently presented in part at the 2nd International Conference on Reactive Polymer Processing, Pittsburgh, Pa., in November 1982, described preparing various initiators for anionically polymerizing lactams including a polymeric initiator. This initiator is prepared by reacting hexamethylene diisocyanate (HDI) with a polypropylene oxide diol, having an average molecular weight of 2000, by slow addition of the polyol (1 mole) to two moles of HDI. The resulting product was reacted with anhydrous lactam at 80° C. No mechanical properties data are reported on the final product. Indeed, further work is said to be required to begin exploring the processability and properties of the products. This paper also reports that reaction ratio and other process governing parameters are not known and further work is required.

U.S. Pat. No. 4,400,490 describes the anionic polymerization of a lactam with an epoxy-compound in the presence of a basic catalyst and a promoter. The epoxy compound can be the reaction product of a polymeric polyol and an epoxy compound.

U.S. Pat. No. 3,793,399 describes the use of a polyol, soluble in molten caprolactam, for improving the impact resistance of polycaprolactam. An organic nitrogen compound is used as a promoter in the polymerization.

The use of etherified polyols in the anionic polymerization of caprolactam is described in U.S. Pat. No. 3,770,689.

SUMMARY, OBJECTS AND DESCRIPTION OF THE INVENTION

The present invention therefore provides a novel and advantageous N-substituted carbamoyl-lactam compound which can be used, among other things, for the preparation of impact resistant nylon block copolymers.

It has been found that this selected group of compounds is highly suitable for use as activator in the preparation of nylon block copolymers, more in particular in the so-called RIM (Reaction Injection Molding) or RRIM (Reinforced RIM) systems, in which it is most essential that the polymerization proceeds within a very short time. In addition, these compounds can be used to prepare highly impact-resistant articles from nylon block copolymers. Another very important application of the compound is in lacquers. These compounds are highly suitable as the blocked isocyanate component in polyurethane lacquers.

The N-substituted carbamoyl-lactam compound according to the present invention is characterized by the formula:

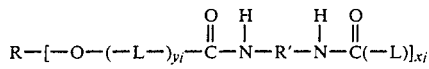

where:
R is a polyol radical from a polyol having the formula R—(OH)$_{xi}$, where
$x_i$ is an integer $\geq 2$
R' is an n-alkyl group, a branched chain alkyl group, or a cyclic alkyl group, aralkyl, alkaryl or aryl group, whether or not cyclic,
$y_i$ is an integer $>0$,
(—L) is an unopened lactam ring and
(—L—) is an opened lactam block.

Exemplary R' groups include, for instance, hexamethylene, toluyl, difenylmethylene and 1,5 hexyl.

R groups include, for instance, polyethylene glycol, polypropylene glycol and copolymers thereof, ethoxylated and/or propoxylated triols and tetrols.

The —L— and —L groups can be derivatives of an identical lactam ring. Advantageously the lactam ring is composed of from 5 to 12 carbon atoms.

It is an essential aspect of the invention, that the mean value of $y_i$ is greater than zero, i.e. that at least some of the lactam rings are incorporated in the activator molecule, between the polyol residue and the poly-isocyanate residue. In general the product will be a mixture of various compounds, wherein some lactam groups are eliminated, and other are present. The mean value of the amount of eliminated lactam groups as a fraction of the total amount of lactam groups that could theoretically be present if of each lactam blocked polyisocyanate one lactam ring was opened, and incorporated between the polyol residue, an the polyisocyanate residue, lies between 0.01 and 0.95. More particularly it lies between 0.50 and 0.75 intermediate lower values, however, such as 0.05, 0.10 or 0.25 can also be advantageous. The mean value of $y_i$ is, of course, 1 minus the amount of eliminated lactam.

$Y_i$ values in accordance with the present invention correspond to effectiveness as an activator and/or differences in desired end product of a "promoted" reaction.

The compounds according to the present invention can be prepared by reacting a polyol and a lactam-blocked polyisocyanate in the liquid state, advantageously at a temperataure of at most 150° C., in the presence of a metal compound catalyst. The temperatures range upwards from the melting point of the lactam or the lactam-polyol mixture up to at most about 150° C. The complete disclosure of the contemporaneously filed application titled 'Process for the Preparation of An N-Substituted Carbamoyl-Lactam Compound', Ser. No. 641,772 is hereby incorporated by reference.

Surprisingly and unexpectedly, under the conditions specified, the reaction between a polyol and a lactam-blocked diisocyanate proceeds quickly. Moreover, virtually no polymerization of the lactam(s) occur(s).

The present invention is especially important in the application of 1,6-hexane diisocyanate, for, highly surprisingly, it has been found that the reaction with a polyol can be carried out selectively with a symmetrical, lactam-blocked diisocyanate and earth alkali metal.

The term 'lactam-blocked polyisocyanate' means the product of the reaction of a polyisocyanate with a lactam, such as the reaction with a polyisocyanate with caprolactam. In principle, virtually all isocyanate groups have reacted with a lactam molecule to form the following group:

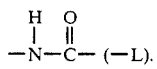

The presence of an opened lactam group in the N-substituted carbamoyl lactam compound can have an advantageous effect upon the mechanical properties of the nylon block copolymer prepared therewith. These lactam groups have a tendency to influence the behavior of the activator molecule in the partially polymerized polyol-lactam system. It is presently believed that during polymerization the activator eventually precipitates from the lactam-polyamide system. The presence of some lactam groups apparently either prevent premature phase separation or alternatively force the activator-groups to the phase boundary. In either instance, this means that the activator groups are effectively performing the desired objects for a longer time during the polymerization reaction.

Various catalysts can be used for preparing the compound of the present invention. The amount of the catalyst may vary; however, the amount generally ranges from 0,5 mole % to 15 mole % of the lactam blocked isocyanate compound. In particular it is advantageous to use group IA, IIA or VIII-metal compounds. In a special embodiment of the present invention it is advantageous to use Lewis acids. In most cases Lewis acids have no catalytic activity for the lactam polymerization but only for the reaction between polyol and the lactam blocked isocyanate. Examples of suitable catalysts are bromomagnesium lactamate, sodium lactamate, potassium lactamate, magnesium chloride, calcium ethoxide, calcium lactamate, calcium acetylacetonate, barium lactamate, barium chloride, barium acetylacetonate, zinc chloride, zinc acetylacetonate, zinc lactamate, cadmium chloride, cadmium acetyl acetonate, cadmium lactamate, boron acetylacetonate, aluminium trilactamate, aluminium chloride, chloroaluminium dilactamate, lactam aluminium chloride, tin(II)chloride, tin(II)ethoxide, tin(II) actylacetonate, titanium trichloride, titanium (III) acetylacetonate, titanium (III) ethoxide, vanadium (III) ethoxide, vanadium (III) acetylacetonate, vanadium (III) chloride, chromium (III) chloride, chromium (III) acetylacetonate, manganese (II) chloride, manganese (II) acetylacetonate, iron (III) chloride, iron (III) acetylacetonate, iron (II) acetylacetonate, cobalt (II) chloride, cobalt (II) acetylacetonate, nickel acetylacetonate, nickel chloride, chromium (III) acetate, copper (II) acetylacetonate.

The polyol can be various organic hydroxy compounds such as a polyfunctional hydroxy compounds having at least two hydroxyl groups per molecule. Generally, the known polyols may be employed. Advantageously, the polyol is a polyetherpolyol, polyesterpolyol, polybutadienepolyol, siloxane containing polyol and/or a so-called 'polymeric' polyol. The 'polymeric' polyols as defined herein include graft polymers obtained by grafting one or more ethylenically unsaturated monomers onto a polyether polyol as well as the polyurea dispersions in polyols (PUD). These polyurea dispersions can be obtained by dissolving a diamine or hydrazine together with a diisocyanate in stoichiometric amounts in a polyol and reacting the dissolved compounds to form a polyurea compound dispersed in the polyol.

The amount of the ethylenically unsaturated monomer grafted on the polyol ranges from 10–35% by weight on the final grafted product ('polymeric' polyol). Examples of suitable grafting monomers are especially acrylonitrile or a mixture of styrene and acrylonitrile. A suitable product of this type is known as Niax 31-28. obtainable from Union Carbide Corporation. Likewise, the amount of polyurea dispersed in the polyol is from 10–35% by weight of the total dispersion.

Advantageously these 'polymeric' polyols may be employed to yield a product (nylon block copolymer) having a higher flexural modulus while, surprisingly, avoiding a decrease in impact resistance. Other examples of polyols that can advantageously be used are the poly(oxyethylene) and poly(oxypropylene) adducts or blends thereof of diols, triols and tetrols, polyols with polyether segments containing polyesters, polyester polyamine-polyols and polylactones. Polyols obtained by ethoxylating and/or propoxylating ethylene diamine, glucose, fructose, saccharose or trimethylolpropane are also suitable.

The polyols described hereinabove are mainly of a relatively high molecular weight. Advantageously, the equivalent weight of these polyols is at least 300, more particularly ranges between about 1000 and about 2500. In these ranges optimal properties of the final object are obtained, viz. a high impact-strength combined with a high flexural modulus without problems in preparing the activator, due to high viscosity.

It is to be understood that any molecular weight, or equivalent weight, referred to herein are numerical average weights. Furthermore, the term equivalent weight of a polyol is understood to mean the numerical average weight of the polyol per hydroxyl group, i.e. the molecular weight divided by the functionality.

The lactam terminated diisocyanaste can be prepared by reacting lactam such as caprolactam, and a diisocyanate, such as hexamethylenediisocyanate, isophorondiisocyanate, toluenediisocyanate, methylene bis(-phenylisocyanate) MDI and hydrogenated MDI, or modified MDI such as carbodiimide modified MDI, (Isonate 143L, Upjohn Company or Mondur PF, Mobay Chemical Corporation) and diol extended prepolymers of MDI (Isonate 181 or 191). Other suitable isocyanates are XDI, H$_6$XDI, and hydrogenated TDI.

As already indicated, preferably molten lactam is used as the reaction medium. Caprolactam is particularly advantageous. It is also possible, however, to carry out the reaction in another solvent which is inert to the polyisocyanate, such as a lactone. Suitable alternative solvents are toluene, xylene, caprolactone and dodecanolactone.

In addition, also a mixture of a lactam with an inert solvent or a mixture of different lactams may be used. Suitable lactams include, for instance, caprolactam and dodecanolactam.

The ratio of the reaction products depends on their functionality and on the desired properties of the end product. In general, per equivalent of hydroxyl groups in the polyol to be used, at least one equivalent of lactam-blocked diisocyanate will be used, so that, in principle, every hydroxyl group can react with one lactam-blocked diisocyanate molecule. In the event that an otherwise "deficient" amount of diisocyanate is used, relative to the number of hydroxyl groups, for example 3 diisocyanate molecules per 4 hydroxyl groups, it is achieved that a number of polyol molecules combine, so that a higher-molecular polyol block is obtained.

The present invention also relates to a process of preparing a nylon block copolymer and to an article partly or wholly made from such a nylon block copolymer. This process is characterized in that an N-substituted carbamoyl-lactam compound of the above-described type is in molten lactam reacted to form a nylon block copolymer, in the presence of a basic lactam-polymerization catalyst. Such catalysts have already been described above, in connection with preparing the carbamoyl-lactam compound. Examplary catalysts include sodium lactamate, magnesium dilactamate and lactam magnesium bromide or chloride. A small amount of catalyst is sufficient; for example less than 1 mole % of catalyst, relative to the lactam to be polymerized can be used. Larger amounts of catalyst, for example up to 2 mole %, may also be used.

The block polymer is formed in a short time, for example in less than 10 minutes. More particularly the block polymer can be obtained in as short of time as 10 seconds and up to 5 minutes, under moderate conditions of temperature (100° C. to 220° C.) and pressure ( 1 bar to 30 bar).

The ratio of lactam monomer to carbamoyl-lactam compound may vary within wide limits. In general, ratio is between 5 wt. % and 9 wt. % of each of the components. For obtaining suitable impact-resistant articles with a reasonable hardness and stiffness it is preferred to have 5-40 wt. % of carbamoyl-lactam compound relative to the total mixture. Advantageously, 10 wt. % to 30 wt. % carbamoyl-lactam compound is used.

The goal in preparing nylon block copolymers is to achieve a number-average molecular weight (N.A.M.W.) of the nylon blocks of at least 2000, and advantageously the object is obtained at a N.A.M.W. of at least 4000. These goods can be attained by varying the number of carbamoyl-lactam groups originating from the carbamoyl-lactam compound relative to the added amount of lactam. This can be done, for example, by using 1 mol % of a difunctional carbamoyl lactam compound with respect to caprolactam gives a nylon block with a N.A.M.W. of about 5500.

In preparing the nylon block copolymer, the same lactam is preferably used in preparing the carbamoyl-lactam compound. Advantageously, an exemplary lactam is caprolactam. Other lactams are also suitable.

In the preparation of the nylon block copolymer it may be desirable to carry out the polymerization in the presence of one or more compounds normally used in nylon block copolymers, such as fillers, plasticizers, flame retardants, stabilizers, and reinforcing fibers, such as asbestos or glass fibers. These materials are well-known in the art.

The invention will now be further explained by the following non-limiting examples.

N-SUBSTITUTED CARBAMOYL-LACTAM COMPOUNDS

Example I 295.9 g (0.75 mole) caprolactam-blocked hexamethylene diisocyanate, 79.1 g caprolactam and 750 g (0.375 mole) polypropylene glycol (a diol with a molecular weight of 2000) were brought to 150° C. Next 13.4 g sodium lactamate in caprolactam was added, with stirring. The amount of catalyst relative to the blocked diisocyanate was 2.5 mole %. Immediately after addition of the catalyst, an increase in viscosity of the reaction mixture was observed. After reaction for 1 hour at 150° C., the mixture was cooled to room temperature. Analysis revealed that the amount of free caprolactam had increased, so that in at least part of the reaction caprolactam must have been split off. Polypropylene glycol and unreacted blocked diisocyanate were no longer detectable. The amount of eliminated caprolactam was 64%.

Example II 5.9 g (0.015 mole) caprolactam-blocked hexamethylene diisocyanate, 1.6 g caprolactam and 20 g (0.01 mole) PPG 2000 were heated at 150° C. With stirring at this temperature 1.1 g sodium lactamate in caprolactam was added (10 mole % of catalyst relative to blocked diisocyanate). After reaction for 15 minutes at 150° C., the mixture was cooled to room temperature. In the product, no more polypropylene glycol and unreacted blocked diisocyanate were detectable. The amount of free caprolactam had clearly increased however, so that in at least part of the reaction caprolactam must have been eliminated.

Example III (Comparative Example)

59.9 g (0.015 mole) of caprolactam-blocked hexamethylene diisocyanate, 1.6 g caprolactam and 20 g (0.01 mole) PPG 2000 were for 15 minutes heated at 190° C., with stirring to obtain a product. After cooling to room temperature, no change of the initial composition was found to have occurred.

Examples IV through IX

Caprolactam-blocked hexamethylene diisocyanate, caprolactam and a polyol mentioned in Table I were heated to a temperature also mentioned in Table I.

With stirring at this temperature the sodium-lactamate catalyst was added.

TABLE I

| polyether polyol | mol. wt. of polyol | eq $L-\overset{\overset{O}{\|}}{C}-\overset{\overset{H}{\|}}{N}$/ eq OH | mol % cat. relative to diisocyanate | reaction temperature °C. | reaction time min. |
|---|---|---|---|---|---|
| IV Pluracol* TPE 4542 | appr. 4500 | 2 | 2 | 120 | 15 |
| V Tetronic** 901 | appr. 4700 | 2 | 2 | 125 | 30 |
| VI Tetronic 1104 | appr. 8300 | 2 | 2 | 100 | 15 |
| VII Tetronic 1302 | appr. 7800 | 2 | 2 | 125 | 30 |
| VIII Tetronic 707 | appr. 12000 | 2 | 2 | 100 | 15 |
| IX PPG*** 4000 | appr. 4000 | 2 | 2 | 110 | 30 |

*Pluracol is a triol
**Tetronic is a tetraol
***PPG is a diol

PREPARATION OF NYLON BLOCK COPOLYMERS

Example X

In a vessel 92.7 g of N-substituted carbamoyl-lactam compound on the basis of Pluracol TPE 4542 (Example IV) was dissolved in 60 g of caprolactam, under nitrogen. In another vessel, 1.63 g of sodium lactamate was dissolved in 75.7 g of caprolactam, under nitrogen. Both vessels were brought to 105° C. After this temperature had been reached, the contents of the two vessels were mixed and poured into a flat mold (200×200×4 mm) which had been preheated at 100° C. After 10 minutes, the mold was opened. The nylon block copolymer thus obtained, with a polyether content of 30 wt. %, had a notched impact strength (Izod according to ASTM D 256) of 66 kJm$^{-2}$ when dry.

Examples XI through XIII

On the analogy of Example X, nylon block copolymers were prepared from various N-substituted carbomoyl-lactam compounds. In all cases, the catalyst was sodium lactamate. The amount of caprolactam added was divided equally between both vessels. The Izod impact strength was determined on dry product.

| Carbamoyl compound according to Ex. | weight g | cat. g | caprolatam added g | polyether content % | molding time minutes | Izod impact strength kJm$^{-2}$ |
|---|---|---|---|---|---|---|
| V | 66.1 | 2.67 | 161.2 | 20 | 5 | 20 |
| VI | 57.5 | 1.51 | 171.0 | 20 | 10 | 72 |
| VII | 58.1 | 1.59 | 170.3 | 20 | 10 | 72 |

Examples XIV through XVI

On the analogy of Example X, except that this time the temperature of the two vessels before mixing was 120° C., nylon block copolymers were prepared. The catalyst was bromomagnesium lactamate. The amount of caprolactam added was equally divided between the two vessels. The Izod impact strength and the E-modulus were measured on dry product.

| Carbamoyl compound according to Ex. | weight g | cat. g | amount of caprolactam added g | polyether content wt. % | molding time minutes | Izod kJm$^{-2}$ | E-mod. Nmm$^{-2}$ |
|---|---|---|---|---|---|---|---|
| IX | 32 | 6.38 | 223.2 | 10 | 10 | 26 | 1853 |
| IX | 56 | 5.60 | 169.4 | 20 | 16 | 68 | 1527 |
| V | 80 | 7.11 | 221.9 | 20 | 10 | 39 | 1540 |

What is claimed is:

1. An N-substituted carbamoyl-lactam compound having the formula:

$$R-[-O-(-L-)_{yi}-\overset{O}{\overset{\|}{C}}-\overset{H}{\overset{|}{N}}-R'-\overset{H}{\overset{|}{N}}-\overset{O}{\overset{\|}{C}}(-L)]_{xi}$$

wherein said formula

R is a multivalent residue hydrocarbon radical from a polyol, said polyol having the formula $$R-(-OH)_{xi}$$

where xi is an integer $\geq 2$,
R' is a divalent hydrocarbon residue radical,
yi is an integer $>0$,
—(—L) is an unopened lactam ring, and
—(—L—) is an opened lactam block.

2. Compound according to claim 1, wherein (—L) and (—L—) originate from a lactam ring including 5–12 carbon atoms.

3. Compound according to claim 1, wherein R' is a hexyl radical.

4. Compound according to claim 1, wherein R is derived from a polyether polyol, said polyol having an equivalent molecular weight of at least 300.

5. Compound according to claim 4, wherein the equivalent molecular weight is between about 1000 and about 2500.

6. Compound according to claim 1, wherein the mean value of $Y_i$ is from about 0.05 to about 0.99.

7. Compound according to claim 6, wherein the mean value of $Y_i$ is from about 0.25 to about 0.50.

8. Compound according to claim 6, wherein the mean value of $Y_i$ is from about 0.50 to about 0.75.

* * * * *